United States Patent
Gordon et al.

(10) Patent No.: US 7,955,423 B2
(45) Date of Patent: Jun. 7, 2011

(54) SOLID-STATE MEMBRANE MODULE

(75) Inventors: John Howard Gordon, Salt Lake City, UT (US); Dale M. Taylor, Murray, UT (US)

(73) Assignee: Air Products and Chemicals, Inc., Allentown, PA (US)

( * ) Notice: Subject to any disclaimer, the term of this patent is extended or adjusted under 35 U.S.C. 154(b) by 1214 days.

(21) Appl. No.: 11/084,934

(22) Filed: Mar. 21, 2005

(65) Prior Publication Data

US 2006/0207427 A1    Sep. 21, 2006

(51) Int. Cl.
*B01D 53/22* (2006.01)
*B01D 59/12* (2006.01)

(52) U.S. Cl. .......... 96/7; 55/523; 95/54; 96/11; 422/177

(58) Field of Classification Search ................. 95/45, 54; 96/4, 7, 8, 11; 422/177; 55/523
See application file for complete search history.

(56) References Cited

U.S. PATENT DOCUMENTS

| | | | |
|---|---|---|---|
| 5,534,471 A * | 7/1996 | Carolan et al. ................. 502/4 |
| 5,580,497 A | 12/1996 | Balachandran et al. | |
| 5,599,383 A | 2/1997 | Dyer et al. | |
| 5,681,373 A | 10/1997 | Taylor et al. | |
| 5,723,074 A | 3/1998 | Balachandran et al. | |
| 5,938,822 A | 8/1999 | Chen et al. | |
| 6,296,686 B1 | 10/2001 | Prasad et al. | |
| 6,492,290 B1 | 12/2002 | Dyer et al. | |
| 6,565,632 B1 | 5/2003 | van Hassel et al. | |
| 2004/0186018 A1 | 9/2004 | Carolan et al. | |
| 2005/0031531 A1 | 2/2005 | Stein et al. | |

FOREIGN PATENT DOCUMENTS

| | | |
|---|---|---|
| CA | 2171142 | 9/1996 |
| EP | 0 732 138 A2 | 9/1996 |
| EP | 0732138 A2 | 9/1996 |
| EP | 0732306 A1 | 9/1996 |
| JP | 07-240115 A | 9/1995 |
| JP | 08-276112 A | 10/1996 |
| JP | 09-235102 A | 9/1997 |
| JP | 2004-283826 A | 10/2004 |

* cited by examiner

*Primary Examiner* — Duane Smith
*Assistant Examiner* — Sonji Turner
(74) *Attorney, Agent, or Firm* — Bryan C. Hoke, Jr.

(57) ABSTRACT

Solid-state membrane modules comprising at least one membrane unit, where the membrane unit has a dense mixed conducting oxide layer, and at least one conduit or manifold wherein the conduit or manifold comprises a dense layer and at least one of a porous layer and a slotted layer contiguous with the dense layer. The solid-state membrane modules may be used to carry out a variety of processes including the separating of any ionizable component from a feedstream wherein such ionizable component is capable of being transported through a dense mixed conducting oxide layer of the membrane units making up the membrane modules. For ease of construction, the membrane units may be planar.

17 Claims, 4 Drawing Sheets

SOLID-STATE MEMBRANE MODULE

STATEMENT REGARDING FEDERALLY SPONSORED RESEARCH OR DEVELOPMENT

This invention was made with government support under Cooperative Agreement Number DE-FC26-98FT40343 between Air Products and Chemicals, Inc. and the U.S. Department of Energy. The Government has certain rights to this invention.

BACKGROUND OF THE INVENTION

This invention relates to solid-state membrane modules formed from membrane units which are capable of separating a gaseous species from a gaseous species-containing gaseous mixture. This invention further relates to solid-state membrane modules formed from membrane units which are capable of separating oxygen from an oxygen-containing gaseous mixture. The modules, which provide improved pneumatic integrity, may be fabricated from a plurality of planar solid-state membrane units comprising mixed conducting metallic oxides which exhibit electron conductivity and oxygen ion conductivity at elevated temperatures.

Solid state membranes formed from oxygen ion-conducting materials continue to show promise in a variety of commercial processes including the separating of oxygen from oxygen-containing gaseous mixtures. Representative solid-state membranes are those formed from multicomponent metallic oxides which are typically operated at high temperatures (e.g. 700° C. or more) wherein the solid-state membranes conduct both oxygen ions and electrons. When a difference in oxygen partial pressure exists on opposite sides of the mixed conducting metallic oxide membrane and operating conditions are properly controlled, oxygen is separated from the oxygen-containing gaseous mixture as oxygen ions migrate to the low oxygen partial pressure side of the solid-state membrane while an electron flux occurs in the opposite direction of oxygen ion migration in order to conserve charge, producing pure oxygen on the permeate side of the membrane.

Alternatively, the permeated oxygen can be reacted directly with a hydrocarbon-containing gas, either catalytically or non-catalytically, to yield a hydrocarbon oxidation product. Various oxygen-containing gases, such as air, can be used and numerous alternative hydrocarbon oxidation products are possible depending on the operating conditions and catalyst if used.

There is a significant and growing commercial interest in the production of synthesis gas from natural gas and air using mixed-conducting ceramic membrane reactor systems. This technology is presently in the development stage and commercial applications are envisioned in future years as the technology matures. Mixed-conducting ceramic membrane reactor systems produce synthesis gas by the partial oxidation methane to form the synthesis gas components CO, $H_2$, $CO_2$, and $H_2O$. The process is carried out by introducing a methane-containing feed gas and an air feed gas into the membrane reactor system, contacting one surface of the membrane with methane, and contacting the other surface with air. Oxygen permeates through the membrane, methane reacts with permeated oxygen to form a methane/synthesis gas mixture, and methane is further converted into synthesis gas as the mixture travels through the reactor while reacting with additional permeated oxygen.

This process can be integrated favorably with upstream and downstream processes if the methane/synthesis gas stream is at a high pressure, typically 250-450 psig. In addition, process economics are most favorable if the air is at a low pressure, typically less than 50 psig. Therefore, the membranes in the membrane reactor system must be designed to withstand a significant pressure differential between the air side and the methane/synthesis gas side. To achieve high oxygen fluxes through the membrane, the active separating layer of the membrane should be thin, typically less than 200 microns. However, a freestanding membrane of this thickness would have difficulty withstanding a typical pressure differential of 200-400 psig, and the thin separating layer therefore may be structurally supported in some fashion.

A plurality of solid state membrane units may be joined together to form a membrane module wherein passageways are incorporated between each respective membrane unit in order to facilitate introducing the oxygen-containing gaseous mixture to be separated into the module and recovering the oxygen product from the module.

Gas separation modules and fuel cells of the prior art are typically operated under conditions such that a near zero pressure differential exists across the membrane cells wherein problems associated with pneumatic integrity are minimized and minor leaks are tolerated to a limited extent between the cells. These modules may be manifolded in a configuration such that oxygen can exit through the channels within each membrane unit.

Industry is searching for solid-state membrane modules which are suitable for conducting a wide variety of processes and reactions wherein the modules would exhibit improved pneumatic and structural integrity. Moreover, such modules would desirably be readily fabricated and manifolded and would be capable of withstanding the pressure differential necessary in practicing air separation processes and desirable in practicing partial oxidation processes.

BRIEF SUMMARY OF THE INVENTION

The present invention relates to solid-state membrane modules which may be used to carry out a variety of processes including the separating of any ionizable component from a feedstream wherein such ionizable component is capable of being transported through the dense mixed conducting oxide layer of the membrane units making up the membrane modules. For example, the ionizable component may be oxygen present in air wherein oxygen ions are passed through the dense mixed conducting oxide layers of the membrane unit. Hydrogen may also be separated from a feed stream by fabricating the dense mixed conducting oxide layer of each membrane unit from a mixed conducting oxide which is capable of transporting the ionized hydrogen species.

The solid-state membrane modules of the present invention may also be used to carry out a variety of reactions such as oxidative coupling, chemical deoxygenation, oxidative dehydrogenation and the like. For example, the modules may be utilized to produce synthesis gas by oxidation of methane, natural gas or other light hydrocarbons, or to produce unsaturated compounds from saturated hydrocarbon compounds.

The membrane units making up each solid-state membrane module of the present invention may possess a channel-free porous support having connected through porosity which is in contact with a contiguous planar dense mixed conducting oxide layer having no connected through porosity, and optional porous layers and channeled layers which are oriented such that mass transfer limitations associated with oxygen transport are dramatically reduced, oxygen flux is substantially improved and the module demonstrates substantially improved pneumatic and structural integrity as described in U.S. Pat. No. 5,681,373 issued Oct. 28, 1997, which is assigned to Air Products and Chemicals, Inc., Allentown, Pa., and U.S. patent application Ser. No. 10/394,620, filed 21 Mar. 2003. While the dense mixed conducting oxide layer is dense, meaning that the layer does not possess a network of pores, minor fissures or holes may be tolerated to a limited extent provided separation selectivity is not reduced to unacceptable levels.

The term, connected through porosity, means that the channel-free porous support has a matrix of pores throughout its three-dimensional structure which is capable of transferring process gases from one side of the porous support to the opposite side of the porous support. Channel-free means the absence of formed channels capable of transferring process gases from one side of the porous support to the opposite side of the porous support. Formed channels are passages that have been deliberately shaped and are of a prearranged and ordered structure, in contrast with a porous structure, which is random.

One embodiment of the solid-state membrane modules of the present invention comprises at least one membrane unit, where the membrane unit has a dense mixed conducting oxide layer with a first side and a second side, and at least one conduit or manifold in fluid communication with the second side of the dense mixed conducting oxide layer of the solid-state membrane unit wherein the conduit or manifold comprises a dense layer and at least one of a porous layer and a slotted layer contiguous with the dense layer. For ease of construction, the membrane units may be planar. The composition and structure of the conduit and manifold will be described in greater detail below.

Another embodiment of the solid-state membrane modules of the present invention comprises at least one membrane unit, where the membrane unit has a dense mixed conducting oxide layer with a feed side and a permeate side, and at least one conduit or manifold in fluid communication with the permeate side of the dense mixed conducting oxide layer of the solid-state membrane unit wherein the conduit or manifold comprises a dense layer and at least one of a porous layer and a slotted layer contiguous with the dense layer.

Another embodiment of the solid-state membrane modules of the present invention comprises at least one membrane unit, where the membrane unit has a dense mixed conducting oxide layer with a feed side and a permeate side, and at least one conduit or manifold in fluid communication with the feed side of the dense mixed conducting oxide layer of the solid-state membrane unit wherein the conduit or manifold comprises a dense layer and at least one of a porous layer and a slotted layer contiguous with the dense layer.

Another embodiment of the solid-state membrane modules of the present invention comprises (a) at least one membrane unit, wherein the membrane unit has a dense mixed conducting oxide layer with a feed side and a permeate side, and a channeled layer contiguous with the feed side, and (b) at least one conduit or manifold in fluid communication with the channeled layer, wherein the conduit or manifold comprises a dense layer and at least one of a porous layer and a slotted layer contiguous with the dense layer.

A porous layer is a layer having connected through porosity.

A slotted layer is defined herein as any open structure that provides mechanical strength, for example having features such as ribs, channels, ruts, grooves, troughs, furrows, slots, pins, columns, and the like. The slotted layer may be a network of isolated cylindrical, conical, or rectangular pins designed to distribute gas flow while minimizing pressure drop during operation and at the same time distributing and transferring mechanical load through the structure.

The feed side of the dense mixed conducting oxide layer is the side exposed to the feed stream, i.e. a gaseous mixture containing a gas that permeates the membrane. For example, for a module that produces oxygen, the feed side may be exposed to air.

The permeate side of the dense mixed conducting oxide layer is the side exposed to the permeated gas which has permeated the dense mixed conducting oxide layer. For example, for a module that produces oxygen, the permeate side is the side exposed to the produced oxygen.

The conduit may be a spacer, an end cap, or a tube. A spacer is a conduit between two membrane units. An end cap is a conduit at an end of a series of membrane units that provides closure. A tube is an inlet or outlet conduit of a membrane module.

A manifold is a type of conduit with multiple openings for receiving or distributing a fluid or gas and is ascribed its conventional meaning in the art.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

The mixed conducting metal oxide material may have the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral. Alternatively, the mixed conducting metal oxide material may have the general stoichiometric composition $(La_xSr_{1-x})_wCoO_{3-\delta}$ wherein $1.0 > x > 0.1$, $1.05 \geq w \geq 0.95$, and $\delta$ is a number which renders the composition charge neutral. More specifically, the mixed conducting metal oxide material may have the general stoichiometric composition $(La_{0.4}Sr_{0.6})_wCoO_{3-\delta}$ wherein $1.05 \geq w \geq 0.95$ and $\delta$ is a number which renders the composition charge neutral.

Alternately, suitable mixed conducting oxides for fabricating the dense mixed conducting oxide layer and the channel-free porous support of the membrane units can be formed from a mixture of one or more ionically-conducting compositions and one or more electron-conducting compositions to form a composite which possesses mixed conductivity, meaning that the composite conducts ions and electrons under operating conditions.

The channel-free porous support of each membrane unit may also be fabricated from an inert material in the sense that the material does not conduct oxygen ions and/or electrons at process operating conditions, an ionically conducting material, an electronically conducting material or a mixed conducting oxide material of the same or different composition with respect to the dense mixed conducting oxide layer of the membrane module. Preferably, the channel-free porous support is fabricated from a mixed conducting oxide material having thermal and chemical expansion properties which are compatible with the dense mixed conducting oxide layer and any additional layers of the membrane unit. The compositions making up the respective layers should be selected from materials which do not adversely chemically react with one another under process operating conditions.

Representative materials for fabricating the channel-free porous support which are not mixed conducting under process operating conditions, meaning that such materials do not conduct both oxygen ions and electrons at elevated temperatures, include alumina, ceria, silica, magnesia, titania, a high temperature oxygen compatible metal alloy, a metal oxide stabilized zirconia and compounds and mixtures thereof.

The thickness of the channel-free porous support, the porosity and the average pore diameter of the porous material making up the porous support of each membrane unit can be varied to ensure sufficient mechanical strength of the membrane unit. The channel-free porous support may possess pores having a diameter of less than 5 times the thickness of the dense mixed conducting oxide layer. The dense mixed conducting oxide layer of each membrane unit typically has a thickness ranging from 0.01 micrometer to about 500 micrometers.

One or more membrane units of the solid-state membrane module may further comprise a porous layer situated contiguous to the channel-free porous support on a side opposite the dense mixed conducting oxide layer. The membrane units may further comprise one or more additional porous layers which are situated contiguous to the first porous layer on the side opposite the channel-free porous support. The respective porous layers may be fabricated such the porous layers have successively larger average pore radii as a function of distance away from the dense mixed conducting oxide layer. The use of a plurality of porous layers has been found to improve mass transfer characteristics of the solid state membrane module.

The porous layers of the membrane units possess connected through porosity and may be fabricated from an inert material as previously described, meaning a material which does not conduct oxygen ions and electrons at operating temperatures, an ionically-conducting material, an electron-conducting material or a mixed conducting metallic oxide as described with respect to the channel-free porous support and the dense mixed conducting oxide layer.

The desired thickness of each porous layer is regulated by the following considerations. First, the porosity and average pore radius of each porous layer should be regulated such that oxygen flux is not impeded while maintaining sufficient mechanical strength. Second, the pores or pore network within each porous layer should be wide enough so that oxygen flux is not impeded, but not so wide as to cause sagging of the dense mixed conducting oxide layer during fabrication and operation. Third, each porous layer should be compatible with each adjacent layer in terms of chemical reactivity, adhesion and thermal expansion to reduce problems associated with cracking and delamination of the contiguous layers of each planar solid-state membrane unit.

In another alternate embodiment, the membrane units possessing one or more porous layers may further comprise a channeled layer which is situated contiguous to the one or more porous layers on a side opposite the channel-free porous support. Optionally, the membrane unit may possess additional channeled layers which are situated contiguous to the first channeled layer on a side opposite the one or more porous layers.

The channeled layers of a membrane unit may be fabricated from materials which possess connected through porosity or dense materials which do not possess connected through porosity. The channeled layers may be fabricated from an inert material in the sense that the material does not conduct oxygen ions or electrons at process operating conditions, an ionically-conducting material, an electron-conducting material or a mixed conducting oxide material of the same or different composition with respect to the dense mixed conducting oxide layer or the channel-free porous support of the membrane module. As such, suitable materials are those previously described for fabricating the dense mixed conducting oxide layer and the channel-free porous support.

The channels within the channeled layers may be fabricated in a wide variety of shapes, in cross-section, such as rectangular, trapezoidal, semi-circular and the like. The depth and spacing of the channels may be widely varied and optimum designs may be assessed for a given application without undue experimentation. The channeled layer may be partially or totally replaced by means for minimizing gas phase diffusion resistance. A suitable means comprises a repeating network of isolated cylindrical, conical or rectangular pins designed to distribute gas flow while minimizing pressure drop during operation and to distribute and transfer mechanical load through the structure.

Any of the membrane unit embodiments can be further modified by placing a catalyzed layer contiguous to the planar dense mixed conducting oxide layer on a side opposite the channel-free porous support or contiguous to the surface of the membrane unit which is placed in flow communication with a process stream. Catalysts to be deposited onto the enumerated surface of the dense mixed conducting oxide layer of the solid-state membrane modules of this invention include any material which catalyzes the dissociation of oxygen molecules to oxygen ions. Suitable catalysts include metals and oxides of metals selected from Groups II, V, VI, VII, VIII, IX, X, XI, XV and the F Block lanthanides of the Periodic Table of the Elements according to the International Union of Pure and Applied Chemistry. Suitable metals include platinum, palladium, ruthenium, rhodium, gold, silver, bismuth, barium, vanadium, molybdenum, cerium, praseodymium, cobalt, rhodium, and manganese.

The solid-state membrane modules of this invention can conveniently be used to separate oxygen from an oxygen-containing gaseous mixture or to partially oxidize an oxidizable compound wherein the dense mixed conducting oxide layer of each membrane unit is placed in flow communication with the oxygen-containing gaseous mixture to be separated or is placed in flow communication with a feedstock to be partially oxidized to produce synthesis gas or other partially oxidized products.

When an oxygen partial pressure difference is created on opposite sides of the dense mixed conducting oxide layer of each membrane unit, oxygen ions are transported through the dense mixed conducting oxide layer, the oxygen ions recombine into molecules on the opposite or permeate side of the dense mixed conducting oxide layer and the oxygen molecules are transported into the contiguous channel-free porous support having a lower oxygen partial pressure. The porous support is in flow communication with a conduit for conveying oxygen from the channel-free porous support of each membrane unit and out of the module.

Conduits and manifolds will be referred to collectively as a gas conveying means. A gas conveying means may be any of a wide variety of structures for conveying oxygen or other process gases from the solid-state membrane modules. In one embodiment, the channel-free porous support of each membrane unit possesses a network of pores throughout its three dimensions such that the gas conveying means for conveying oxygen or other process streams from each solid-state membrane unit can be situated at any point of contact with the channel-free porous support of each membrane unit.

For example, the gas conveying means for conveying oxygen from the membrane module can be formed into one or more manifolds which are placed in flow communication with the channel-free porous support of each membrane unit in order to collect oxygen which permeates through the dense mixed conducting oxide layer and passes into the channel-free porous support and out into one or more manifolds for collection or use in other process streams. Alternatively, the gas conveying means comprises one or more conduits which traverse the respective membrane units of the solid-state membrane module at any position of the module provided that such conduits are in flow communication with the same side, feed or permeate, of each membrane unit.

Described in terms of an oxygen separation embodiment, the term, traverse, means that a conduit is placed in flow communication with each membrane unit via a structure which is impervious to gases other than the permeated gas, for example oxygen. The conduit does not necessarily pass through each planar membrane module unit, but merely connects each planar membrane unit. When the conduit does not pass through each respective membrane unit, each membrane unit possesses a void space from which the permeated gas which has been separated from each membrane unit can pass out of each successive membrane unit and be collected via the conduit.

It is known that the dimensions of materials change with changing temperature due to thermal expansion and contraction. In addition to these thermal dimensional changes, mixed conducting metal oxide materials undergo chemical dimensional changes that are functions of the metal oxide oxygen stoichiometry. At isothermal conditions, an article made of mixed conducting metal oxide material will increase in dimensions with decreasing oxygen stoichiometry. At isothermal conditions, the oxygen stoichiometry decreases with decreasing oxygen partial pressure. Since the equilibrium oxygen stoichiometry increases with decreasing temperature, an article made of mixed conducting metal oxides will contract due to both thermal and chemical dimensional changes as the temperature decreases at a constant oxygen partial pressure. Conversely, an article made of mixed conducting metal oxides will expand by both thermal and chemical dimensional changes as the temperature increases at a constant oxygen partial pressure. This is described in an article entitled "Chemical Expansivity of Electrochemical Ceramics" by S. B. Adler in J. Am. Ceram. Soc. 84 (9) 2117-19 (2001).

Dimensional changes therefore result from equilibrium oxygen stoichiometry changes in mixed conducting metal oxide materials. Changing the temperature at a constant oxygen partial pressure or changing the oxygen partial pressure at a constant temperature will change the equilibrium oxygen stoichiometry of the mixed conducting metal oxide material. When a mixed conducting metal oxide is used as an ion transport membrane, for example, an oxygen partial pressure difference across the membrane creates a difference in the equilibrium oxygen stoichiometry at each of the two surfaces of the membrane, which in turn creates the thermodynamic driving force for oxygen ions to diffuse through the membrane.

During startup or shutdown of a gas separation system using mixed conducting metal oxide membranes, the temperature is increased or decreased and the oxygen partial pressure on one or both sides of the membrane may change. The equilibrium oxygen stoichiometry of the mixed conducting material will change in response to the changes in temperature and oxygen partial pressure. Oxygen anions will diffuse into or out of the mixed conducting material and the mixed conducting material will approach its equilibrium oxygen stoichiometry value. As the oxygen stoichiometry and temperature changes, the dimension of the membrane will change. The time required for the membrane to reach chemical equilibrium with the oxygen partial pressures on the surfaces of the membrane will depend on the oxygen anion diffusion rate into or out of the membrane. The time required for equilibration to occur is a function of the material composition, the temperature, and the characteristic dimensions of the membrane modules.

Different membrane compositions will have different oxygen anion diffusivities, and compositions with higher diffusivities will equilibrate with the gas phase faster, all other factors being equal. For a given membrane composition, the oxygen anion diffusivity increases exponentially with temperature. Therefore, equilibration times decrease with increasing temperature. Finally, the equilibration time increases approximately with the square of the characteristic dimension (e.g., length or thickness) of the parts in the membrane modules. For example, therefore, thinner parts will equilibrate faster than thicker parts, all other factors being equal. As the thickness of a part increases and as the temperature decreases, it becomes increasingly difficult to keep the interior of the part in equilibrium with the gas phase due to sluggish diffusion of oxygen anions into or out of the part.

It is known that temperature gradients in a mixed conducting metal oxide ceramic part can create differential strains due to differential thermal expansion and contraction. Similarly, oxygen stoichiometry gradients in a ceramic part can create differential strains due to differential chemical expansion and contraction. The problem is that this gradient in oxygen stoichiometry may be sufficiently large to create a correspondingly large differential chemical expansion, and therefore large mechanical stresses, which lead to failure of the part. Therefore, it is desirable to avoid differential chemical expansion or at least to control the differential chemical expansion to below maximum allowable values.

Conduits and manifolds connecting the solid state membrane units are generally made from the same or similar materials as the membrane units. These conduits and manifolds often need to be thicker than the membranes in order to satisfy structural requirements. Applicants have discovered that while increasing the thickness can provide the necessary structural support, the increased thickness increases the conduits' susceptibility to failure due to thermal and chemical expansion strains.

The gas conveying means of the current invention comprises a dense layer and at least one of a porous layer and a slotted layer. Prior to the current invention, the gas conveying means was comprised entirely of a dense layer to provide the structural integrity and other required functions of the gas conveying means. Compared to the prior art, the thickness of the dense layer according to the current invention is significantly reduced and at least one of a porous layer and a slotted layer is added to provided the required structural integrity. In this way the overall strength requirements for the structure can be met while making the structure more tolerant to thermal or chemical transients and less likely to mechanically fail. Inventors have discovered that although porous layers and slotted layers may not provide as much strength as dense layers of equal thickness, porous layers and slotted layers can provide the required structural integrity and they provide an additional benefit of reducing chemical stresses within the gas conveying means, thereby reducing the probability of mechanical failure.

The dense layer of the gas conveying means for conveying oxygen from the membrane module may be fabricated from the same materials used to form the dense mixed conducting oxide layer as well as the porous support, provided that the selected material is impervious to gases other than oxygen although the material may also be impervious to oxygen. Specifically, for the case where oxygen is the permeated species, the gas conveying means must be incapable of permeating gases other than oxygen contained in the oxygen-containing gaseous mixture. For example, when the module is utilized to separate oxygen from an oxygen-containing gaseous mixture, the gas conveying means must form a barrier between components other than oxygen contained in oxygen-containing gaseous mixture and the oxygen product. While the dense layer is dense, meaning that the layer does not possess a network of pores, minor fissures or holes may be tolerated to a limited extent provided product purity is not reduced to unacceptable levels.

The porous layer of the gas conveying means of the current invention for conveying oxygen from the membrane module may be fabricated from the same materials described above for the channel-free porous support.

The slotted layer of the gas conveying means of the current invention for conveying oxygen from the membrane module may be fabricated from materials which possess connected through porosity or dense materials which do not possess connected through porosity. The slotted layers may be fabricated from an inert material in the sense that the material does not conduct oxygen ions or electrons at process operating conditions, an ionically-conducting material, an electron-conducting material or a mixed conducting oxide material of the same or different composition with respect to the dense mixed conducting oxide layer, the channel-free porous support of the membrane module, or the dense layer of the conduit. As such, suitable materials are those previously described for fabricating the dense mixed conducting oxide layer and the channel-free porous support and the channeled layer of the membrane units.

The gas conveying means may comprise a dense layer and one or more slotted layers wherein the orientation of the channels are angled with respect to one another thereby forming a lattice-type pattern.

The channels within the slotted layers of the gas conveying means may be fabricated in a wide variety of shapes, in cross-section, such as rectangular, trapezoidal, semi-circular and the like. The depth and spacing of the channels may be widely varied and optimum designs may be assessed for a given application without undue experimentation.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 \leq w \leq 1.05$; and wherein $\delta$ is a number that renders the compound charge neutral. More specifically, the mixed conducting metal oxide material may have the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral. Alternatively, the mixed conducting metal oxide material may have the general stoichiometric composition $(La_xSr_{1-x})_nCoO_{3-\delta}$ wherein $1.0 > x > 0.1$, $1.05 \geq w \geq 0.95$, and $\delta$ is a number which renders the composition charge neutral. More specifically, the mixed conducting metal oxide material may have the general stoichiometric composition $(La_{0.4}Sr_{0.6})_wCoO_{3-\delta}$ wherein $1.05 \geq w \geq 0.95$ and $\delta$ is a number which renders the composition charge neutral.

The solid-state modules comprising the gas conveying means of the present invention can be used to recover oxygen from an oxygen-containing gaseous mixture by contacting the oxygen-containing gaseous mixture with the dense mixed conducting oxide layers of the membrane units, establishing a positive oxygen partial pressure difference on opposite sides of the dense mixed conducting oxide layers of each membrane unit by producing an excess oxygen partial pressure in the feed side of the membrane unit and/or by producing a reduced oxygen partial pressure on the permeate side of the membrane unit; contacting the oxygen-containing gaseous mixture with the dense mixed conducting oxide layer of the membrane units at a temperature greater than about 300° C. to separate the oxygen-containing gaseous mixture into an oxygen permeate stream. The oxygen permeate stream passes through the channel-free porous support of each membrane unit and is subsequently collected by the conduit for conveying the oxygen product. The oxygen-depleted gaseous mixture can be recycled into the process or transferred to another process to recover its heat value, or optionally further heated and passed through an expander.

The oxygen which has been separated from the oxygen-containing gaseous mixture may be collected or may be reacted in-situ with an oxidizable composition to form a partially oxidized product. Suitable oxygen-containing gaseous mixtures include air or any gaseous mixture containing molecular oxygen or other sources of oxygen such as $N_2O$, NO, $NO_2$, $SO_2$, $CO_2$ and the like.

The solid-state membrane modules comprising gas conveying means of the present invention may also be used to carry out a variety of reactions such as oxidative coupling, chemical deoxygenation, oxidative dehydrogenation and the like. For example, the modules may be utilized to produce synthesis gas by oxidation of methane, natural gas or other light hydrocarbons, or to produce unsaturated compounds from saturated hydrocarbon compounds. According to this embodiment, an oxygen-containing gaseous mixture is introduced into the channel-free porous support of the membrane unit and the gas to be oxidized is placed in contact with the dense mixed conducting oxide layer of each membrane unit of the membrane module. At operating temperatures in excess of 300° C., oxygen is reduced to oxygen ions which are transported across the dense mixed conducting oxide layer to the exterior surface of the membrane unit. The feedstream to be oxidized is placed in flow communication with the exterior surface of the dense mixed conducting oxide layer of membrane unit wherein oxygen ions react with a desired feedstock thereby oxidizing the feedstock and releasing electrons which are transported across the dense mixed conducting oxide layer in a direction opposite the flow of oxygen ions.

The solid-state membrane modules comprising gas conveying means of the present invention may be conveniently utilized to remove trace amounts of oxygen from an oxygen-containing gaseous mixture such as crude argon wherein the gaseous mixture is contacted with the dense mixed conducting oxide layer of each membrane unit and a reducing gas such as hydrogen or methane is contacted with the channel-free porous support wherein the oxygen residing in the gaseous mixture is conducted across the membrane and reacts with hydrogen or methane and is thereby converted to water or water and carbon dioxide, respectively. The oxygen-containing gaseous mixture which is depleted in oxygen may be conveniently collected at pressure.

When the solid-state membrane modules comprising gas conveying means of the present invention are utilized for carrying out the above-mentioned partial oxidation reactions, a catalyst suitable for carrying out the desired reaction is typically situated contiguous to the dense mixed conducting oxide layer of the membrane units on a side opposite the channel-free porous support. Suitable reactants and partial oxidation catalysts are well known in the art.

Applicants' invention can be more readily understood by referring to the Detailed Description of the Invention and the Figures which are attached hereto.

DETAILED DESCRIPTION OF THE INVENTION

Figure 1:
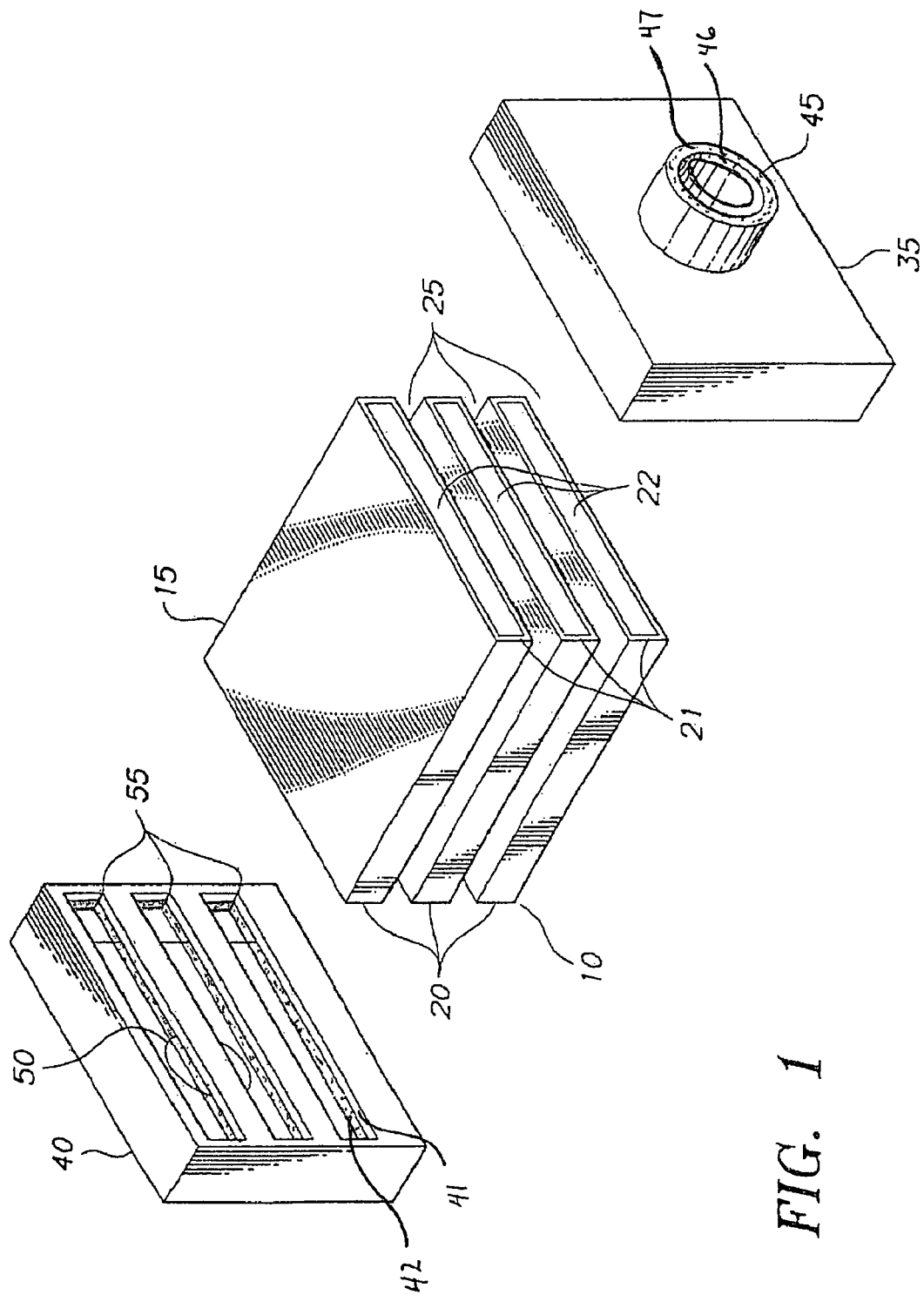
FIG. 1 is a perspective view of one embodiment of a solid-state membrane module which comprises a plurality of planar membrane units formed from a dense mixed conducting oxide layer which is supported by, and contiguous with a channel-free porous support having connected through porosity. The gas conveying means for discharging oxygen from each planar membrane unit comprises two manifolds of the present invention comprising a dense layer and contiguous porous layer.

FIG. 1 is an exploded perspective view of an embodiment of a planar solid-state membrane module comprising a plurality of planar membrane units and gas conveying means. Planar solid-state membrane module 10 possess an array 15 of gas separation membrane units 20 which are separated by passageways 25. Each membrane unit 20 comprises a channel-free porous support 22 and a dense mixed conducting oxide layer 21. A suitable technique for manufacturing ultrathin solid state membranes is presented in U.S. Pat. No. 5,332,597 issued Jul. 24, 1994, which is assigned to Air Products and Chemicals, Inc., Allentown, Pa. Structures 35 and 40 define spaced exit manifolds having receiving structures 55 into which membrane units 20 are received. Thus, manifolds 35 and 40 are in flow communication with channel-free porous supports 22 of each membrane unit 20 within the array of membrane units 15. Outlet conduits 45 and 50 are in flow communication with structures 35 and 40 and are adapted to carry process streams from the planar solid-state membrane module 10. In this illustration, the manifolds 35 and 40 comprise a dense layer 41 and a porous layer 42. Alternatively or in addition to porous layer 42, manifolds 35 and 40 may comprise a slotted layer (not shown). Outlet conduits 45 and 50 comprise a dense layer 46 and a porous layer 47. Alternatively or in addition to porous layer 47, outlet conduits 45 and 50 may comprise a slotted layer (not shown). The outlet conduit may be configured as shown with the porous or slotted layer exterior to the dense layer or alternatively configured with the porous or slotted layer interior to the dense layer. Another alternative is the configuration where the porous or slotted layer is interior and exterior with a dense layer therebetween.

The embodiment according to FIG. 1 can be conveniently utilized to separate oxygen from an oxygen-containing gaseous mixture by introducing the oxygen-containing gaseous mixture through passageways 25 and into contact with the dense mixed conducting layers 21 of each of the membrane units 20. The driving force for separating oxygen from an oxygen-containing gaseous mixture is provided by creating a difference in oxygen partial pressure on opposite sides of the dense mixed conducting oxide layer 21 of each membrane unit 20.

An oxygen partial pressure difference on opposite sides of dense mixed conducting oxide layer 21 can be created by compressing the oxygen-containing gaseous mixture within passageways 25 to a pressure sufficient to recover the oxygen permeate stream at a pressure of greater than or equal to about one atmosphere. In the case of air, typical pressures range from about 75 psia to about 500 psia or about 150 to about 350 psia and the optimum pressure will vary depending upon the amount of oxygen in the oxygen-containing gaseous mixture. Conventional compressors are capable of achieving the required compression. Alternately or in combination with use of compression, a positive oxygen partial pressure difference on opposite sides of dense mixed conducting oxide layer 21 can be achieved by partially evacuating the channel-free porous support 22 by drawing a vacuum on inlets 45 or 50 of structures 35 and 40 to create a partial pressure difference sufficient to recover the oxygen product.

The oxygen which has been separated from the oxygen-containing gaseous mixture may be stored in a suitable container or utilized in another process. The oxygen permeate typically comprises pure oxygen or high purity oxygen defined as a gas generally containing at least about 90 volume % $O_2$, or more than about 95 volume % $O_2$, or more than 99 volume % $O_2$.

The solid-state membrane modules comprising gas conveying means of the present invention can be used to carry out a variety of processes including the separating of any ionizable component from a feedstream wherein such ionizable component is capable of being transported through the dense mixed conducting oxide layer of the membrane units. For example, the ionizable component may be oxygen present in air wherein oxygen ions are passed through the dense mixed conducting oxide layers of the membrane unit. Hydrogen can also be separated from a feed stream by fabricating the dense mixed conducting oxide layer of each membrane unit from a mixed conducting oxide which is capable of transporting the ionized hydrogen species.

The membrane module 10 can be readily utilized for producing synthesis gas. The solid-state membrane module 10 is heated to a temperature ranging from 300° to 1200° C., or from 500° to 900° C. The upper operating temperature is limited only by the temperature at which the compositions of the membrane unit begin to sinter. A feedstock comprising light hydrocarbons such as methane, natural gas, ethane or any available light hydrocarbon mixture is introduced into passageways 25 and an oxygen-containing gaseous mixture is introduced into the channel-free porous supports 22 of each membrane unit 20 by passage into either structure 35 or structure 40 using either of conduits 45 or 50 as inlets. The oxygen-containing gaseous mixtures flows into channel-free porous supports 22 of each membrane unit 20 wherein oxygen is ionized and passed across the dense mixed conducting oxide layer 21 of each membrane unit 20. The feedstock contacts oxygen ions which are formed at the surface of dense layers 21 resulting in formation of synthesis gas.

The feedstock to be utilized in carrying out the synthesis gas reaction may be natural gas which may be utilized straight from the wellhead at pressure or produced industrially. A typical industrially produced feedstock comprises a composition having about 70 percent by weight of methane, about 10 percent by weight of ethane, 10 percent to 15 percent by weight of carbon dioxide with the balance comprising smaller amounts of propane, butane and nitrogen. The feedstock may also comprise a mixture of $C_1$-$C_6$ hydrocarbons which may optionally be diluted with any inert diluent such as nitrogen, helium and the like. Suitable catalysts which may be deposited onto the dense mixed conducting oxide layer include conventional catalysts for producing synthesis gas as are well known in the art.

The membrane module according to FIG. 1 may also be utilized to produce unsaturated hydrocarbons. The process is conducted in a manner analogous to the preparation of synthesis gas wherein the membrane module 10 is heated to a temperature in excess of 300°, or from 500° to 1000° C. Thus, the feedstock and oxygen-containing gaseous mixture are passed through the membrane module in the same path as the feedstock and oxygen-containing gaseous mixture discussed in the synthesis gas reaction description.

The feedstock may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms, aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Suitable catalysts which may be placed on the dense mixed conducting oxide layer on each membrane unit on a side opposite the channel-free porous support include Shell 105 catalyst which comprises about 90% iron oxide, 4% chromium oxide and 6% potassium carbonate.

Figure 2:
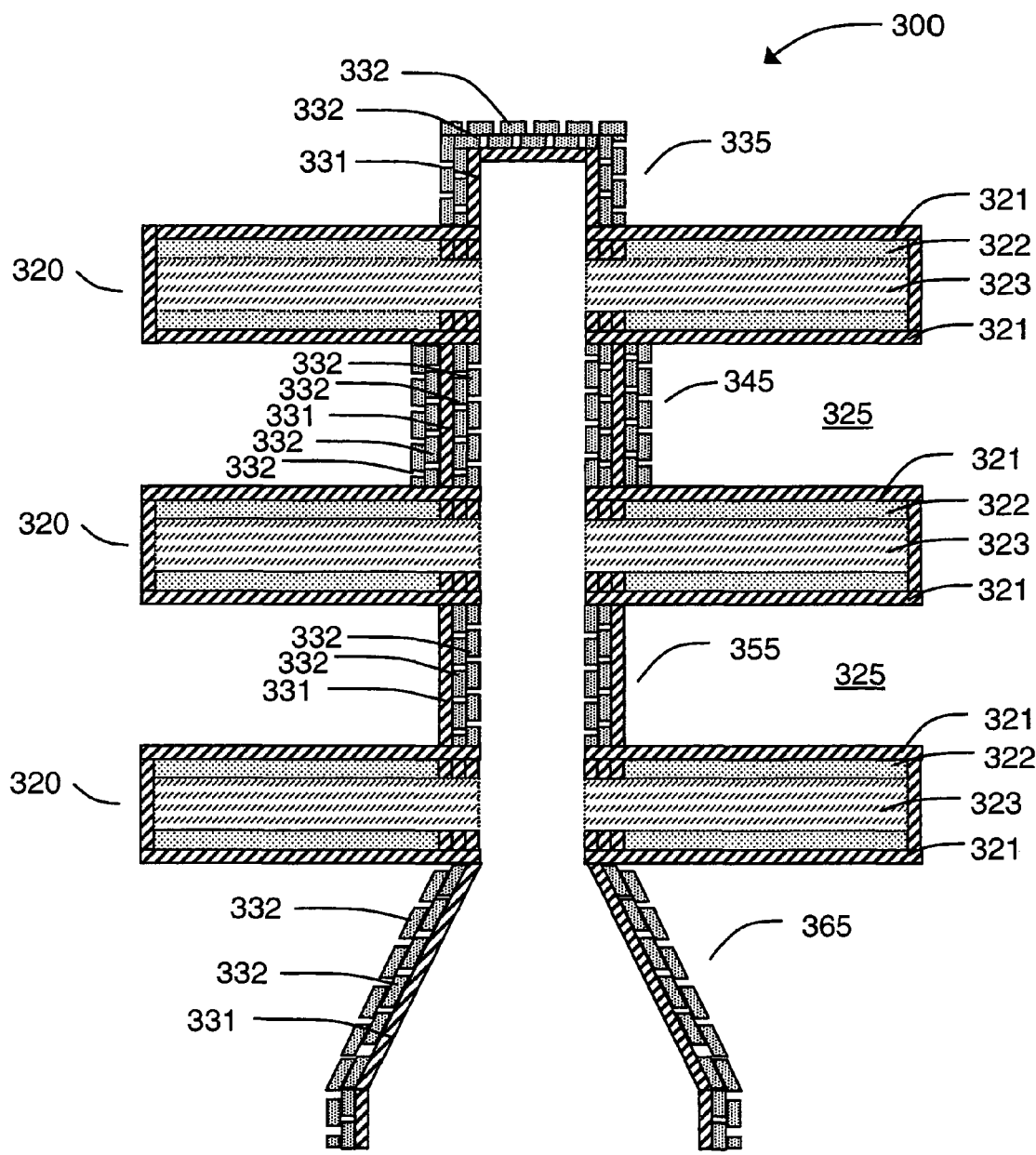
FIG. 2 is a sectional view of a solid-state membrane module which illustrates gas conveying means embodiments comprising slotted layers.

FIG. 2 presents a sectional view of the solid-state membrane module and illustrates three general embodiments of gas conveying means which are suitable for practicing the present invention. The figure is not to scale and not in proportion, but rather the gas conveying means are enlarged to illustrate detail. Solid-state membrane module 300 comprises an array of membrane units 320 wherein each membrane unit comprises a dense mixed conducting oxide layer 321 which is supported by and contiguous with a channel-free porous support 322 having connected through porosity. FIG. 2 also shows optional channeled layer 323 within the channel-free porous support 322. The plurality of membrane units 320 are separated by passageways 325. Gas conveying means 335, 345, 355 and 365 are in fluid communication with channel-free porous supports 322 of each membrane unit 320 and may be secured to the membrane array by conduit collars (not shown). Gas conveying means 345 and 355 are conduits, also called spacers, between adjacent solid-state membrane units. Gas conveying means 335 and 365 are an end cap and tube, respectively.

Gas conveying means 335, 345, 355 and 365 each possess a dense layer 331 which is supported by slotted layers 332. Slotted layers 332 provide additional support for dense layer 331 so that the structure can withstand the pressure differential exerted on opposite sides of gas conveying means 335, 345, 355 and 365 during operating conditions and structural loading. Also, because of the channels, there is little concentration variation through the slotted layer. As a result, the thickness of dense layer 331 is reduced as compared to dense layers of the prior art. The reduction in the dense layer thickness decreases the chemical stresses in the dense layer resulting from thermal or chemical transients. Any number of slotted layers may be used and they may be on the feed side of the dense layer as shown for gas conveying means 335 and 365, the permeate side of the dense layer as shown for gas conveying means 355, or on both sides of the dense layer as shown for gas conveying means 345. Gas conveying means may convey permeated gas from the membrane units by connecting adjacent membrane units or conveying permeated gas out of the module. Gas conveying means 335, 345, 355, and 365 are typically constructed of the same composition as the dense mixed conducting oxide layer and porous support.

Figure 3:
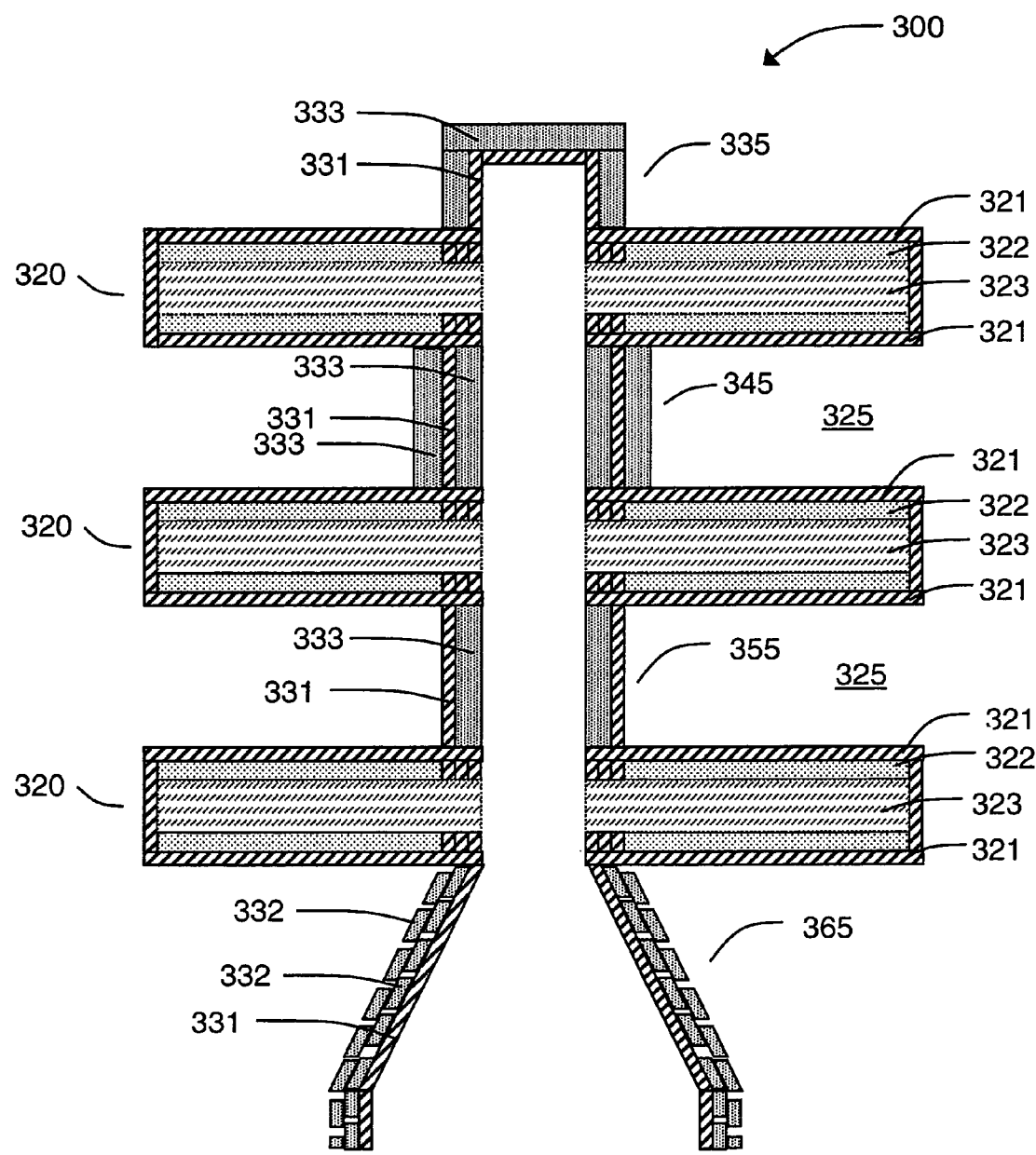
FIG. 3 is a sectional view of a solid-state membrane module which illustrates three gas conveying means embodiments, each embodiment which comprises porous layers.

FIG. 3 presents a sectional view of the solid-state membrane module and illustrates three additional general embodiments of gas conveying means which are suitable for practicing the present invention. The figure is not to scale and not in proportion, but rather the gas conveying means are enlarged to illustrate detail. Solid-state membrane module 300 comprises an array of membrane units 320 wherein each membrane unit comprises a dense mixed conducting oxide layer 321 which is supported by and contiguous with a channel-free porous support 322 having connected through porosity. FIG. 3 also shows optional channeled layer 323 within the channel-free porous support 322. The plurality of membrane units 320 are separated by passageways 325. Gas conveying means 335, 345, 355 and 365 are in fluid communication with channel-free porous supports 322 of each membrane unit 320 and may be secured to the membrane array by conduit collars (not shown). Gas conveying means 345 and 355 are conduits, also called spacers, between adjacent solid-state membrane units. Gas conveying means 335 and 365 are an end cap and tube, respectively.

Gas conveying means 335, 345, and 355 each possess a dense layer 331 which is supported by porous layers 333. Porous layers 333 provide additional support for dense layer 331 so that the structure can withstand the pressure differential exerted on opposite sides of gas conveying means 335, 345, and 355 during operating conditions and structural loading. Also, because of the connected through porosity, there is little permeated gas concentration variation through the porous layer. As a result, the thickness of dense layer 331 is reduced as compared to dense layers of the prior art. The reduction in the dense layer thickness decreases the chemical stresses in the dense layer resulting from thermal or chemical transients. Any number of porous layers may be used and they may be on the feed side of the dense layer as shown for gas conveying means 335, the permeate side of the dense layer as shown for gas conveying means 355, or on both sides of the dense layer as shown for gas conveying means 345. Gas conveying means may convey permeated gas from the membrane units by connecting adjacent membrane units or conveying permeated gas out of the module. Gas conveying means 335, 345, and 355 are typically constructed of the same composition as the dense mixed conducting oxide layer and porous support.

Figure 4:
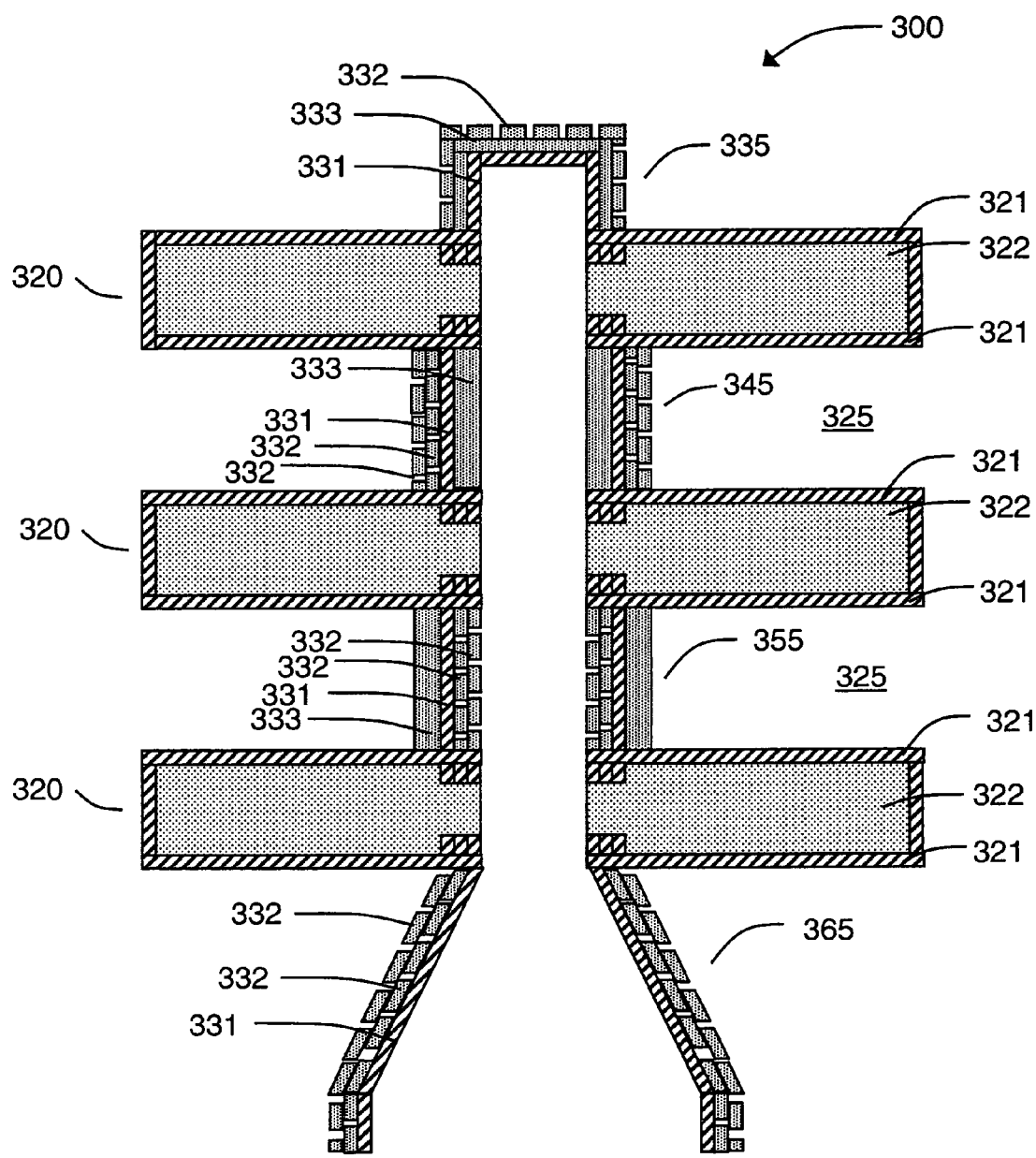
FIG. 4 is a sectional view of a solid-state membrane module which illustrates three gas conveying means embodiments comprising porous layers and slotted layers.

FIG. 4 presents a sectional view of the solid-state membrane module and illustrates three additional general embodiments of gas conveying means which are suitable for practicing the present invention. The figure is not to scale and not in proportion, but rather the gas conveying means are enlarged to illustrate detail. Solid-state membrane module 300 comprises an array of membrane units 320 wherein each membrane unit comprises a dense mixed conducting oxide layer 321 which is supported by and contiguous with a channel-free porous support 322 having connected through porosity. The plurality of membrane units 320 are separated by passageways 325. Gas conveying means 335, 345, 355 and 365 are in fluid communication with channel-free porous supports 322 of each membrane unit 320 and may be secured to the membrane array by conduit collars (not shown). Gas conveying means 345 and 355 are conduits, also called spacers, between adjacent solid-state membrane units. Gas conveying means 335 and 365 are an end cap and tube, respectively.

Gas conveying means 335, 345, and 355 each possess a dense layer 331 which is supported by slotted layers 332 and porous layers 333. Porous layers 333 and slotted layers 332 provide additional support for dense layer 331 so that the structure can withstand the pressure differential exerted on opposite sides of gas conveying means 335, 345, and 355 during operating conditions and structural loading. Also, because of the connected through porosity of the porous layers and the open channels of the slotted layers, there is little permeated gas concentration variation through the porous and slotted layers. As a result, the thickness of dense layer 331 is reduced as compared to dense layers of the prior art. The reduction in the dense layer thickness decreases the chemical stresses in the dense layer resulting from thermal or chemical transients. Any number of porous and slotted layers may be used. A porous layer and slotted layer may both be on the feed side of the dense layer as shown for gas conveying means 335. A porous layer may be on the permeate side of the dense layer and slotted layers on the feed side of the dense layer as shown for gas conveying means 345. Slotted layers may be on the permeate side of the dense layer and porous layer on the feed side of the dense layer as shown for gas conveying means 355. Gas conveying means may convey permeated gas from the membrane units by connecting adjacent membrane units or conveying permeated gas out of the module. Gas conveying means 335, 345, and 355 are typically constructed of the same composition as the dense mixed conducting oxide layer and porous support.

It is clear from this description that any combination of slotted layers 332 and porous layers 333 on the feed side and/or the permeate side of the dense layer may be used. The gas conveying means are in fluid communication with a channel-free porous support 322 of at least one of the solid-state membrane units and the gas conveying means comprise a dense layer and at least one of a porous layer and a slotted layer contiguous with the dense layer.

The embodiments according to FIGS. 2, 3 and 4 can be conveniently utilized to separate oxygen from an oxygen-containing gaseous mixture by introducing the oxygen-containing gaseous mixture through passageways 325 and into contact with the dense mixed conducting layers 321 of each of the membrane units 320. The driving force for separating oxygen from an oxygen-containing gaseous mixture is provided by creating a difference in oxygen partial pressure on opposite sides of the dense mixed conducting oxide layer 321 of each membrane unit 320. An oxygen partial pressure difference on opposite sides of dense mixed conducting oxide layer 321 may be created by compressing the oxygen-containing gaseous mixture within passageways 325 to a pressure sufficient to recover the oxygen permeate stream at a pressure of greater than or equal to about one atmosphere. Typical pressures range from about 75 psia to about 500 psia or about 150 psia to about 350 psia and the optimum pressure will vary depending upon the amount of oxygen in the oxygen-containing gaseous mixture. Conventional compressors are capable of achieving the required compression. Alternately or in combination with compression, a positive oxygen partial pressure difference on opposite sides of dense mixed conducting oxide layer 321 can be achieved by partially evacuating the channel-free porous support 322 by drawing a vacuum on the permeate side to create a partial pressure difference sufficient to recover the oxygen product.

The oxygen which has been separated from the oxygen-containing gaseous mixture may be stored in a suitable container or utilized in another process. The oxygen permeate typically comprises pure oxygen or high purity oxygen defined as a gas generally containing at least about 90 volume % $O_2$, or more than about 95 volume % $O_2$ or more than 99 volume % $O_2$.

When the solid-state membrane modules of FIG. 2, 3 or 4 are utilized for producing synthesis gas, the membrane module is heated to a temperature ranging from 300° to 1200° C., or from 500° to 900° C. A feedstock comprising light hydrocarbons such as methane, natural gas, ethane or any available light hydrocarbon mixture is introduced into passageways 325 and an oxygen-containing gaseous mixture is introduced into the channel-free porous supports 322 of each membrane unit 320 by passage into gas conveying means 345, and 355 via gas conveying means 365, which is used as an inlet. The oxygen-containing gaseous mixtures flows into channel-free porous supports 322 of each membrane unit 320 wherein oxygen is ionized and passed across the dense mixed conducting oxide layer 321. Oxygen is separated from the oxygen-containing gaseous mixture in this process also. However, the feed and permeate sides of the dense mixed conducting oxide layer are reversed. The feedstock contacts oxygen ions which are formed at the surface of dense layers 321 resulting in formation of synthesis gas.

The membrane module may be alternatively constructed as described in U.S. patent application Ser. No. 10/394,620, Publication No. U.S. 2004/0186018, filed Mar. 21, 2003 and incorporated into the present application in its entirety by this reference. The ceramic spacers, which are gas conveying means, shown in FIGS. 8A and 8B of patent application Ser. No. 10/394,620 may be constructed according to the present invention to each comprise a dense layer and at least one of a porous layer and a slotted layer contiguous with the dense layer. In this geometry, the channeled layer is on the feed side and the channel-free porous support is on the permeate side of the dense layer of the solid-state membrane unit. Accordingly, the gas conveying means is in fluid communication with the channeled layer of the solid-state membrane unit. Similarly the end cap and tube of patent application Ser. No. 10/394,620 may be constructed according to the present invention to each comprise a dense layer and at least one of a porous layer and a slotted layer contiguous with the dense layer.

The channel-free porous support on the permeate side may comprise a catalyst for synthesis gas production.

The feedstock to be utilized in carrying out the synthesis gas reaction is preferably natural gas which may be utilized straight from the wellhead or produced industrially. A typically industrially produced feedstock comprises a composition having about 70 percent by weight of methane, about 10 percent by weight of ethane, 10 percent to 15 percent by weight of carbon dioxide with the balance comprising smaller amounts of propane, butane and nitrogen. The feedstock may also comprise $C_1$-$C_6$ hydrocarbons which may optionally be diluted with any inert diluent such as nitrogen, helium and the like. Suitable catalysts which can be deposited onto the dense mixed conducting oxide layer include conventional catalysts are well known in the synthesis gas as are well known in the art.

The membrane module according to FIGS. 2, 3 and 4 may also be utilized to produce unsaturated hydrocarbons. The process is conducted in a manner analogous to the preparation of synthesis gas wherein the membrane module is heated to a temperature in excess of 300° C., or from 500° to 1000° C. Thus, the feedstock and oxygen-containing gaseous mixture are passed through the membrane module in the same path as the feedstock and oxygen-containing gaseous mixture discussed in the synthesis gas reaction description.

The feedstock may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms, aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Suitable catalysts include Shell 105 catalyst which comprises about 90% iron oxide, 4% chromium oxide and 6% potassium carbonate.

Example vessel systems for housing membrane modules are described in Stein et al., U.S. patent application Ser. No. 10/635,695, filed Aug. 6, 2003, Publication No. US2005/0031531.

Thin dense layers of the desired multicomponent metallic oxide having a thickness ranging from 100 microns to about 0.01 microns in thickness may be deposited onto the enumerated porous layers by known techniques. For example, the membrane composites may be manufactured by first forming a porous body from relatively coarse sized particles of the multicomponent metallic oxide. A slurry of finer particles of the same material or a similar, compatible multicomponent metallic oxide may then be coated onto the porous material and cured to the green state, the two layer system then being fired to form the composite membrane.

The contiguous porous and dense layers of the present membranes may be formed from one or more multicomponent metallic oxides comprising an oxide of at least two different metals or a mixture of at least two different metal oxides wherein the multicomponent metallic oxide demonstrates electron conductivity as well as oxygen ion conductivity at elevated temperatures. Multicomponent metallic oxides suitable for practicing the present invention are referred to as "mixed" conducting oxides because such multicomponent metallic oxides conduct electrons as well as oxygen ions at elevated temperatures.

The mixed conducting oxides suitable for practicing the present invention may be prepared according to conventional methods including mixing and firing a desired stoichiometric ratio of the respective metallic oxides making up the mixed conducting oxide, thermally decomposing nitrates and acetates, and utilizing the citric acid preparation method. Each of these methods is well known in the art and is suitable for making the mixed conducting oxides of the present invention.

The membrane units of the present invention may be prepared by applying a dense layer of a desired mixed conducting oxide onto the desired porous substrate by conventional chemical vapor deposition techniques followed by sintering to obtain the desired dense layer. In order to obtain an optimal dense coating, a smaller average pore radius in the surface of the channel-free porous support may be used compared to the average pore radius in the bulk. This may be achieved by using two or more porous layers which differ in properties such as pore radius and porosity.

The gas conveying means of the present invention may be fabricated in a number of ways.

For the dense layer, a cast ceramic tape of the material with the expansion properties similar to the membrane module may be used such that the material becomes dense after sintering, for example with less than 5% porosity.

For the porous layer, a cast ceramic tape of the same material with coarse particle size and a poreformer may be used such that the material is somewhat porous after sintering, for example in the range of 10% to 60% porosity.

A dense layer sandwiched between two porous layers may be made by taking porous cast ceramic tape of the material with expansion properties similar to the membrane module, applying solvent such as alpha terpineol to at least one surface, and wrapping the tape on to a mandrel such that the tape overlaps on itself until the desired inside thickness is reached. Next, dense tape may be wrapped until the desired dense layer thickness is reached. Subsequently, porous tape may be wrapped on top of the dense layer until the desired outside porous thickness is reached. Afterward, the wrapped tape assembly may be placed in a bag and the layers isostatically pressed together. The assembly is then removed from the bag and mandrel and sintered into ceramic tube, for example by hang firing.

Alternatively, the steps of placing the assembly in a bag and isostatically pressing can be replaced by pressing the layers by a roller in compression with the mandrel.

A dense layer sandwiched between multiple slotted layers, i.e. a latticed pattern, may be made by taking a length of dense tape and cutting slots into the tape such that when the tape is wrapped onto a mandrel, the tape forms a lattice-like pattern, wrapping the slotted tape onto the mandrel until the desired latticed thickness is attained, wrapping unslotted tape until the desired dense thickness is attained, then again wrapping slotted tape until the desired outside latticed thickness is attained. If desired, a single length of tape slotted at both ends but not in the middle length of the tape could be used so that the tape has no joints in the wrapping process. This assembly may be isostatically pressed or pressing the layers by a roller in compression with the mandrel.

Depending on whether a seal must be made at the end of the gas conveying means, slotted layers on the inside or outside of the conduit may be made at the ends of the conduits as desired.

Many modifications of the illustrated embodiments may be made without departing from the spirit and scope of the invention as recited by the claims.

We claim:

1. A module for separating a gaseous species from a gaseous species-containing gaseous mixture comprising:
   at least one solid-state membrane unit, wherein the at least one solid-state membrane unit comprises a dense mixed conducting oxide layer with a first side and a second side; and
   a conduit in fluid communication with the second side of the dense mixed conducting oxide layer of the at least one solid-state membrane unit wherein the conduit comprises a dense layer and at least one of a porous layer and a slotted layer contiguous with said dense layer.

2. The module of claim 1 wherein the first side is the feed side and the second side is the permeate side.

3. The module of claim 2 further comprising a channel-free porous support having connected through porosity contiguous with the permeate side of the dense mixed conducting oxide layer.

4. The module of claim 3 wherein the conduit is in fluid communication with the channel-free porous support.

5. The module of claim 1 wherein the at least one solid-state membrane unit is planar.

6. The module of claim 1 wherein the gaseous species is oxygen.

7. The module of claim 6 wherein the gaseous species containing gaseous mixture is air.

8. The module of claim 1 wherein the conduit comprises at least two slotted layers.

9. The module of claim 1 wherein the first side is the permeate side and the second side is the feed side.

10. The module of claim 9 further comprising a channel-free porous support having connected through porosity contiguous with the feed side of the dense mixed conducting oxide layer.

11. The module of claim 10 wherein the conduit is in fluid communication with the channel-free porous support.

12. The module of claim 9 further comprising a channel-free porous support having connected through porosity contiguous with the permeate side of the dense mixed conducting oxide layer and a channeled layer contiguous with the feed side of the dense mixed conducting oxide layer.

13. The module of claim 12 wherein the conduit is in fluid communication with the channeled layer.

14. The module of claim 12 wherein the at least one solid-state membrane unit further comprises a catalyzed layer.

15. The module of claim 1 wherein the dense mixed conducting oxide layer comprises a first mixed conducting oxide and the conduit comprises a second mixed conducting oxide.

16. The module of claim 15 wherein the first mixed conducting oxide is the same as the second mixed conducting oxide.

17. A module for separating a gaseous species from a gaseous species-containing gaseous mixture comprising:
a plurality of solid-state membrane units, wherein said plurality of solid-state membrane units comprise a dense mixed conducting oxide layer with a feed side and a permeate side and a channel-free porous support having connected through porosity contiguous with the permeate side of the dense mixed conducting oxide layer; and
a conduit in fluid communication with the channel-free porous support of at least one of said plurality of solid-state membrane units wherein the conduit comprises a dense layer and at least one of a porous layer and a slotted layer contiguous with said dense layer.

* * * * *